United States Patent
Spears

(10) Patent No.: US 8,255,507 B2
(45) Date of Patent: Aug. 28, 2012

(54) ACTIVE DIRECTORY OBJECT MANAGEMENT METHODS AND SYSTEMS

(75) Inventor: Steven E. Spears, Riverview, FL (US)

(73) Assignee: Verizon Patent and Licensing, Inc., Basking Ridge, NJ (US)

(*) Notice: Subject to any disclaimer, the term of this patent is extended or adjusted under 35 U.S.C. 154(b) by 69 days.

(21) Appl. No.: 12/545,743

(22) Filed: Aug. 21, 2009

(65) Prior Publication Data

US 2011/0047206 A1     Feb. 24, 2011

(51) Int. Cl.
*G06F 15/173* (2006.01)
(52) U.S. Cl. .......................... 709/223; 709/203; 707/792
(58) Field of Classification Search .................. 709/203, 709/223; 707/792
See application file for complete search history.

(56) References Cited

U.S. PATENT DOCUMENTS

| | | | | |
|---|---|---|---|---|
| 7,467,203 B2* | 12/2008 | Kang et al. | .................. | 709/224 |
| 7,774,314 B1* | 8/2010 | Chai et al. | .................. | 707/640 |
| 7,779,265 B2* | 8/2010 | Dubhashi et al. | .................. | 713/182 |
| 7,840,599 B2* | 11/2010 | Beadles et al. | .................. | 707/792 |
| 2007/0244896 A1* | 10/2007 | Liu et al. | .................. | 707/9 |
| 2008/0109883 A1* | 5/2008 | Hernoud et al. | .................. | 726/5 |
| 2010/0257587 A1* | 10/2010 | Chazin | .................. | 726/3 |

OTHER PUBLICATIONS

"Understanding Identity Lifecycle Manager '2'," Jun. 2008, Microsoft Corporation.
"Introduction to Active Directory Application Mode," Aug. 2003, Microsoft Corporation.

* cited by examiner

*Primary Examiner* — David Lazaro
*Assistant Examiner* — Marie Georges Henry

(57) ABSTRACT

An exemplary method includes providing, by a web server subsystem, a web-based interface for display on a client device within a domain associated with the web server subsystem, receiving, by the web server subsystem, a request via the web-based interface from an end-user to perform a management activity associated with an active directory object, acquiring, by the web server subsystem, authorization from an object security subsystem to perform the management activity associated with the active directory object, transmitting, by the web server subsystem, the request to a web services subsystem that is independent of the domain associated with the web server subsystem, performing, by the web services subsystem, the management activity associated with the active directory object, and updating in real-time, by the web services subsystem, an active directory maintained by a domain controller subsystem in accordance with the performed management activity. Corresponding methods and systems are also disclosed.

23 Claims, 20 Drawing Sheets

Active Directory Object Management (ADOM)

You are the Administrator of the following:

▶ Administrator Table

| Project | Domain | Object | Action |
|---|---|---|---|
| General Domain Administration | ECNETE | NameAdmin | Update This Object |
| General Domain Administration | ECNETI | NameAdmin | Update This Object |
| General Domain Administration | ENTEGRAI | Name Admin Mgnt | Update This Object |
| General Domain Administration | ENTEGRAI | Name Admin Users | Update This Object |
| General Domain Administration | GNI | NameAdmin | Update This Object |
| 12345678 | | | |

You are the Security Trustee of the following:

▶ Trustee Table

[+] Show the Active Directory Avitar Legend

Related Links
Global Group FAQ's

Video Links
ADOM Table of Contents
(15 seconds)
ADOM Introduction
(4.25 minutes)
ADOM – Full Video
(15 minutes)

Page Options
▲ Change Options

Active Directory Object Management (ADOM) – Trustee Support Page

Domain: US
Object Name: DAS-NFS02-Notice
Object Type: Distribution List
Description: DAS-NFS02-Notice
Last Certification: Mar 2 2009 2:58PM
Reason for Update:

You have 100 characters available.

Administrators to Add

Roe, John
Major, Mary

Administrators to Remove

☐ Doe, John
☐ Doe, Jane

▲ Administrator Updates

▶ Certify Object
Last Certification: Mar 2 2009 2:58PM
As the Security Trustee, you are required to validate the information regarding this object at least on a Quarterly basis. As the Security Trustee, you have the option to update the certification ahead of schedule. Would you like to certify now?

This is an object which requires you to review and validate the membership via the Administrator Page.

☑ I certify that I have reviewed and agree with the accuracy of the data contained on this page to include the Audit Trail, listing of Administrators, and the information provided in the Description and Keywords. If there are any changes to be made, I will make them as needed.

[ Certify Object ]

Fig. 15

Active Directory Management (ADOM) – Trustee Support Page ⟋1400

Domain: US
Object Name: DAS-NFS02-Notice
Object Type: Distribution List
Description: DAS-NFS02-Notice
Last Certification: Mar 2 2009 2:58PM
Reason for Update:

You have 100 characters available.

Administrators to Add

Roe, John
Major, Mary

Administrators to Remove

☐ Doe, John
☐ Doe, Jane

▲ Administrator Updates
▲ Certify Object
▲ Delete Object
▲ Transfer Trustee Ownership  ⟵1412

This will send an email to the person you identify as the new Security Trustee and will depend upon their approval.

Enter the new Trustee's Employee ID:  [ V000000 ] ⟵1602

[ Transfer Ownership ] ⟵1604

▲ Update Description and Search Keywords
▲ Audit Trail

Active Directory Object Management (ADOM) – Trustee Transfer

It has been requested that you take over the responsibilities for being the Security Trustee for more information on being a Security Trustee) for the following. If you have any questions regarding this, please contact the current Security Trustee which is listed in your email notice. (click here Domain: US
Object Name: DAS-NFS02-Notice
Object Type: Distribution List
Description: DAS-NFS02-Notice ☐ Yes, I will accept the assignment as Security Trustee
☑ No, I do not wish to become the Security Trustee Submit

1700

▼ Audit Trail

Below you will find the audit trail for the past 90 days:          Click here to send me the audit trail ⟋1802

| Name | Comments | Date | Action Performed |
|---|---|---|---|
| John Doe | Group Membership Report | 4/24/2009 4:55:00 PM | Membership Report |
| John Doe | Demo | 4/24/2009 4:17:00 PM | Membership Addition |
| | v089805 – has been added | | |
| John Doe | Demo | 4/24/2009 4:17:00 PM | Membership Removal |
| | CN=Major, Mary – has been removed | | |
| John Doe | Log retrieval request | 4/24/2009 4:14:00 PM | Send Audit Log |

Active Directory Object Management (ADOM) System – New Object

Project: [Please select a Project ▽]  Add a Project

Domain: [Please select a Domain ▽]

Object Type: [Please select an Object Type ▽]

Object Name: [_____]  You have 75 characters available

Description: [_____]  You have 500 characters available

Key Words/UNC Path: [_____]  You have 500 characters available

Internal Tracking Data: [_____]  You have 500 characters available
The data provided in this field is for internal use only. It is not visible to the end user and cannot be updated by the Security Trustee.

Security Trustee: [_____]

Create Object: ● No  ○ Yes

[Insert Object]

Fig. 19

Active Directory Object Management (ADOM) - Search

To search you can enter any of the following:

The UNC Path for a share
The name of an object, this can be a Global Group or account
Search by the key words or description provided by the Security Trustee Search Criteria: DAS-NFS02

[Search]

Click on the email address of either administrator or trustee. A blank email will come up going to that person. Enter wording in the body indicating you want access to the share and state the name of the share. That person will add you to the share and reply to you.

| Domain | Object Name | Description | Keywords/UNC Path | Email Address |
|--------|-------------|-------------|-------------------|---------------|
| US | DAS-NFS02-Notice | DAS-NFS02-Notice | DAS-NFS02-Notice | john.doe@company.com |

Fig. 20

ACTIVE DIRECTORY OBJECT MANAGEMENT METHODS AND SYSTEMS

BACKGROUND INFORMATION

Network administrators often have to manage large and complex networks that stretch across multiple domains each having a plethora of resources and users. Various tools have been developed to assist network administrators in managing such networks. For example, "Active Directory" is a technology created by Microsoft that allows network administrators to hierarchically organize objects (e.g., users, computers, groups, etc.) within a network in order to more easily assign policies, deploy software, apply software updates, and/or perform other management activities associated with one or more objects within the network.

However, the Active Directory framework is relatively rigid in terms of accessibility and deployment. For example, a network administrator must utilize a stand-alone Active Directory application installed on a computer to manage one or more objects within a network. Moreover, delegation of administrative authority over one or more objects from one user to another user and compliance with various security auditing requirements are cumbersome and time consuming using the Active Directory framework.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 11-20 illustrate exemplary web-based interfaces according to principles described herein.

DETAILED DESCRIPTION OF PREFERRED EMBODIMENTS

Exemplary methods and systems for managing one or more active directory objects are described herein. As described in more detail below, a web server subsystem may be configured to provide a web-based interface for display on a client device. The web server subsystem may be further configured to receive a request via the web-based interface from an end-user to perform a management activity associated with an active directory object and acquire authorization from an object security subsystem to perform the management activity associated with the active directory object. If the end-user is authorized to perform the management activity, the web server subsystem may transmit the request to an independent web services subsystem. The web services subsystem may perform the management activity associated with the active directory object and update in real-time an active directory maintained by a domain controller subsystem in accordance with the performed management activity.

As used herein, the term "active directory" refers to any hierarchical grouping of active directory objects included within a particular network (e.g., domain). An active directory may include or be implemented by Microsoft's Active Directory framework and/or any other active directory service as may serve a particular application.

The term "active directory object" (or simply "object") may refer to any entity included within or controlled by a particular domain or network. For example, an active directory object may include, but is not limited to, a user or user account, a group of users (e.g., a global group or distribution list), a computing device (e.g., a personal computer), a resource (e.g., a printer), a service (e.g., email), and/or any other network entity. In some examples, an active directory object may include a unique identifier and a set of attributes defining one or more characteristics, permissions, and/or other settings associated with the active directory object.

The term "management activity" may refer to any activity performed in relation to an active directory object. Exemplary management activities include, but are not limited to, adding one or more users to a global group and/or distribution list, removing one or more users from a global group and/or distribution list, enumerating a global group and/or distribution list, modifying a service account associated with one or more users, creating an active directory object, assigning administrative authority over an active directory object to one or more users, and/or any other activity associated with an active directory object.

Figure 1:
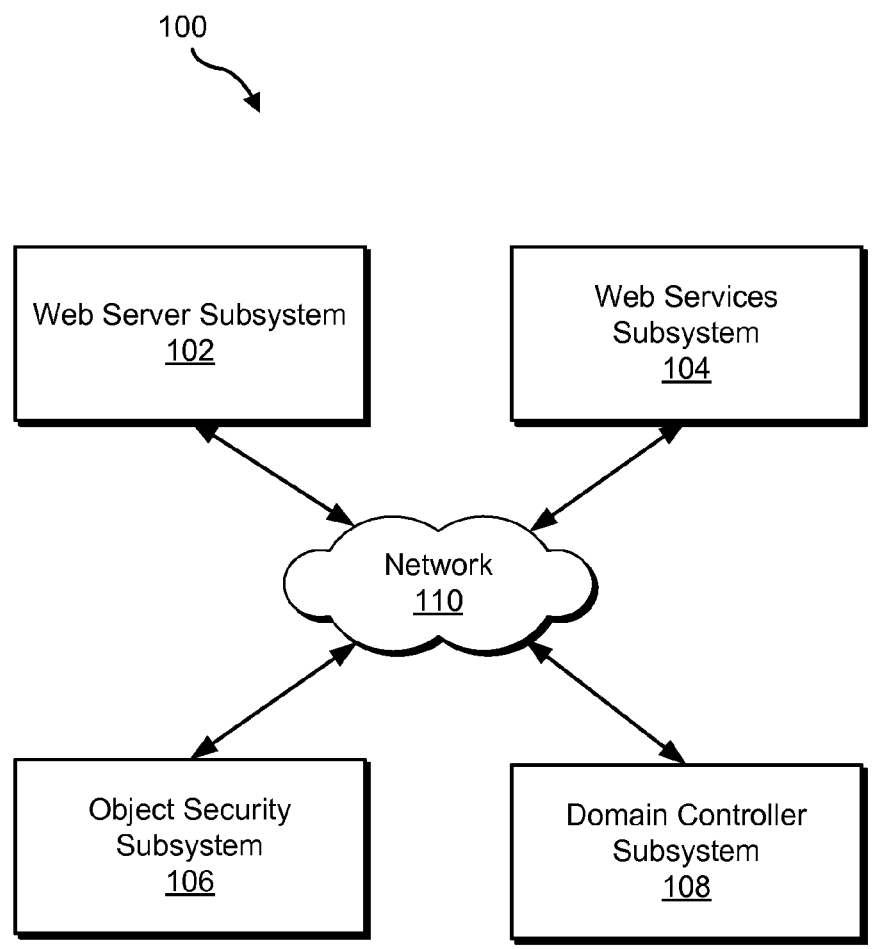
FIG. 1 illustrates an exemplary active directory object management system according to principles described herein.

FIG. 1 illustrates an exemplary active directory object management system 100 (or simply "system 100"). As shown in FIG. 1, system 100 may include a web server subsystem 102, a web services subsystem 104, an object security subsystem 106, and a domain controller subsystem 108 configured to communicate with one another. As will be described in more detail below, system 100 may facilitate real-time management of one or more active directory objects.

Web server subsystem 102 may be specific to a particular domain (which may be trusted or untrusted) and configured to provide a web-based interface for display on a client device within the domain. Web server subsystem 102 may be further configured to receive a request from an end-user via the web-based interface to perform a management activity associated with an active directory object. In response to the request, web server subsystem 102 may determine whether the end-user is authorized to perform the management activity by communicating with object security subsystem 106. If the end-user is authorized to perform the management activity, web server subsystem 102 may transmit the request to perform the management activity to web services subsystem 104. If the end-user is not authorized to perform the management activity, web server subsystem 102 may be configured to prevent the end-user from performing the management activity.

Web services subsystem 104 is may be configured to perform the management activity associated with the active directory object in response to receiving the request from web server subsystem 102. In some examples, web services subsystem 104 may be "independent" in that it is independent of the domain of which web server subsystem 102 is a part. To this end, web services subsystem 104 may provide one or more application programming interfaces ("APIs") configured to facilitate integration of one or more applications executed by web services subsystem 104 with web server subsystem 102, object security subsystem 106, domain controller subsystem 108, and/or any other subsystem and/or device as may serve a particular application. In this manner, as will be described in more detail below, web services subsystem 104 may perform management activities associated with active directory objects autonomous of domain membership.

Web services subsystem 104 may be further configured to update in real-time an active directory maintained by domain controller subsystem 108. In this manner, as will be described in more detail below, information included within the active directory may be available immediately to users thereof.

Object security subsystem 106 may be configured to maintain data representative of one or more authorization relationships between one or more users and one or more active directory objects. As will be described in more detail below, the data may be used to determine whether a particular end-user has authorization to perform a management activity associated with an active directory object.

In some examples, object security subsystem 106 may be further configured to maintain and/or acquire data representative of one or more communication protocols and network paths used to access one or more active directory objects. As will be described in more detail below, this data may be used to facilitate access to an active directory object and updating of an active directory in accordance with a performed management activity.

Object security subsystem 106 may be further configured to maintain a transaction log representative of the management activity performed by web services subsystem 104. In this manner, as will be described in more detail below, compliance with one or more audit requirements may be facilitated.

Domain controller subsystem 108 may be configured to manage active directory objects included within one or more domains. To this end, domain controller subsystem 108 may be configured to maintain an active directory within which the active directory objects are organized.

System 100, including web server subsystem 102, web services subsystem 104, object security subsystem 106, and domain controller subsystem 108, may include any computer hardware and/or computer-implemented instructions (e.g., software), or combinations of computer-implemented instructions and hardware, configured to perform one or more of the processes described herein. For example, system 100, including web server subsystem 102, web services subsystem 104, object security subsystem 106, and domain controller subsystem 108, may include computer hardware (e.g., one or more servers and/or other computing devices) configured to perform one or more of the processes described herein. In some examples, each of the subsystems 102-108 may be implemented on one physical computing device or may be implemented on more than one physical computing device. Accordingly, system 100 may include any number of computing devices, and may employ any of a number of computer operating systems.

One or more of the processes described herein may be implemented at least in part as instructions executable by one or more computing devices. In general, a processor (e.g., a microprocessor) receives instructions, from a computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other medium from which a computer can read.

Web server subsystem 102, web services subsystem 104, object security subsystem 106, and domain controller subsystem 108 may communicate using any communication platforms and technologies suitable for transporting data, including known communication technologies, devices, media, and protocols supportive of remote or local data communications. Examples of such communication technologies, devices, media, and protocols include, but are not limited to, data transmission media, communications devices, Microsoft Internet Information Server ("IIS"), Microsoft .Net 2.x Framework, Java, Extensible Markup Language ("XML"), Lightweight Directory Access Protocol ("LDAP"), Secure LDAP ("SLDAP"), LDAP with Kerberos, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Simple Object Access Protocol ("SOAP"), Session Initiation Protocol ("SIP"), Ethernet, and any other suitable communications technologies, devices, media, and protocols.

In some examples, web server subsystem 102, web services subsystem 104, object security subsystem 106, and domain controller subsystem 108 may communicate via a network 110. Network 110 may include one or more networks, including, but not limited to, wireless networks, broadband networks, closed media networks, cable networks, satellite networks, the Internet, intranets, local area networks, public networks, private networks, optical fiber networks, and/or any other networks capable of carrying data and communications signals between web server subsystem 102, web services subsystem 104, object security subsystem 106, and domain controller subsystem 108. To this end, web server subsystem 102, web services subsystem 104, object security subsystem 106, and/or domain controller subsystem 108 may be implemented at least in part on one or more servers or other network-enabled devices.

Figure 2:
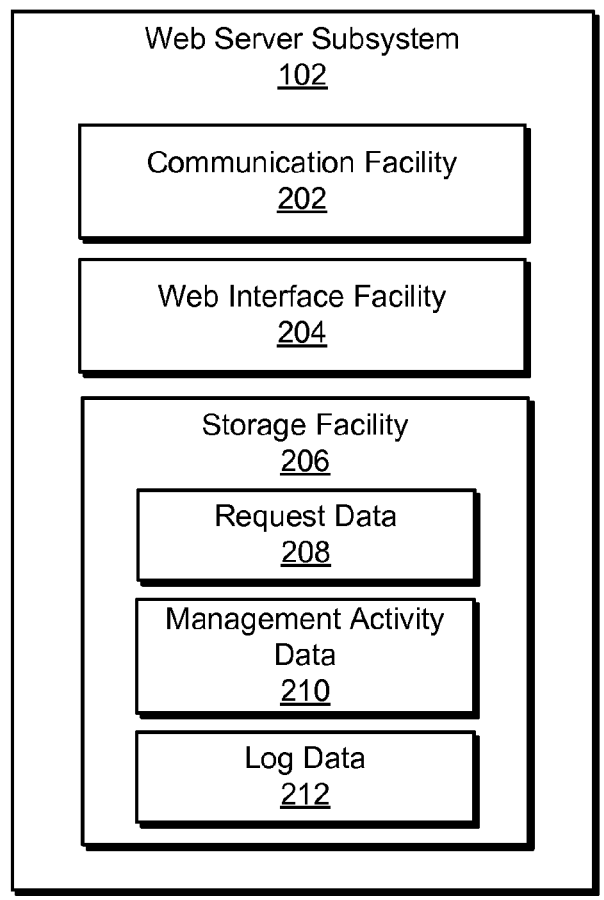
FIG. 2 illustrates exemplary components of a web server subsystem according to principles described herein.

FIG. 2 illustrates exemplary components of web server subsystem 102. As shown in FIG. 2, web server subsystem 102 may include a communication facility 202, a web interface facility 204, and a storage facility 206, which may be in communication with one another using any suitable communication technologies. It will be recognized that although facilities 202-206 are shown to be separate facilities in FIG. 2, any of those facilities may be combined into a single facility as may serve a particular application.

Communication facility 202 is configured to facilitate communication between web server subsystem 102 and web services subsystem 104. For example, communication facility 202 may be configured to establish one or more secure and/or non-secure connections between web server subsystem 102 and web services subsystem 104 over which data may be transmitted between web server subsystem 102 and web services subsystem 104. To illustrate, communication facility 202 may be configured to transmit a request to perform a management activity associated with an active directory object to web services subsystem 104. Communication facility 202 may be further configured to receive data representative of a notification that a requested management activity has been performed from web services subsystem 104. In some examples, communications between web server subsystem 102 and web services subsystem 104 may be performed in accordance with LDAP with Kerberos and/or SLDAP.

Communication facility 202 may additionally or alternatively be configured to facilitate communication between web server subsystem 102 and object security subsystem 106. For example, as will be described in more detail below, communication facility 202 may be configured to acquire authorization to perform a management activity associated with an active directory object and/or authentication data representative of one or more protocols and/or network paths required to perform the management activity from object security subsystem 106. Communication facility 202 may be further configured to transmit data representative of a transaction log of a performed management activity to object security subsystem 106.

Web interface facility 204 may be configured to provide a web-based interface (e.g., a web page) for display on a client device. The client device may be located within a domain associated with web server subsystem 102. Alternatively, the client device may be located outside the domain associated with web server subsystem 102. The web-based interface may be configured to execute a web application configured to facilitate management by an end-user of the client device of one or more active directory objects within the domain associated with web server subsystem 102 and/or any other domain within which the end-user is authorized to operate. The web application executed by the web-based interface may be configured to utilize or run on Microsoft IIS, Microsoft .Net 2.x Framework, JavaScript, and/or any other programming framework or environment. Because the web application is web-based, it is platform independent and does not require the purchase or installation of additional software on the client device. Moreover, as will be described in more detail below, management activities initiated by the end-user via the web-based interface may be performed in real-time without the need for secondary synchronization services to process the management activities.

In some examples, web interface facility 204 is further configured to display on-demand transaction logs representative of one or more performed management activities. In this manner, the end-user may track management activities initiated by the end-user and/or by any other user. Such tracking may be performed to comply with one or more active directory object audit requests or requirements.

Web interface facility 204 may be further configured to provide data representative of one or more results of a performed management activity for display within the web-based interface. For example, after communication facility 202 receives notification that a requested management activity has been performed, web interface facility 204 may provide data representative of one or more results of the performed management activity for display within the web-based interface.

As shown in FIG. 2, storage facility 206 may be configured to maintain request data 208 representative of one or more requests to perform one or more management activities associated with one or more active directory objects as initiated by an end-user, management activity data 210 representative of one or more management activities associated with one or more active directory objects as initiated by an end-user, and log data 212 representative of one or more transaction logs. It will be recognized that storage facility 206 may maintain additional or alternative data as may serve a particular application.

Figure 3:
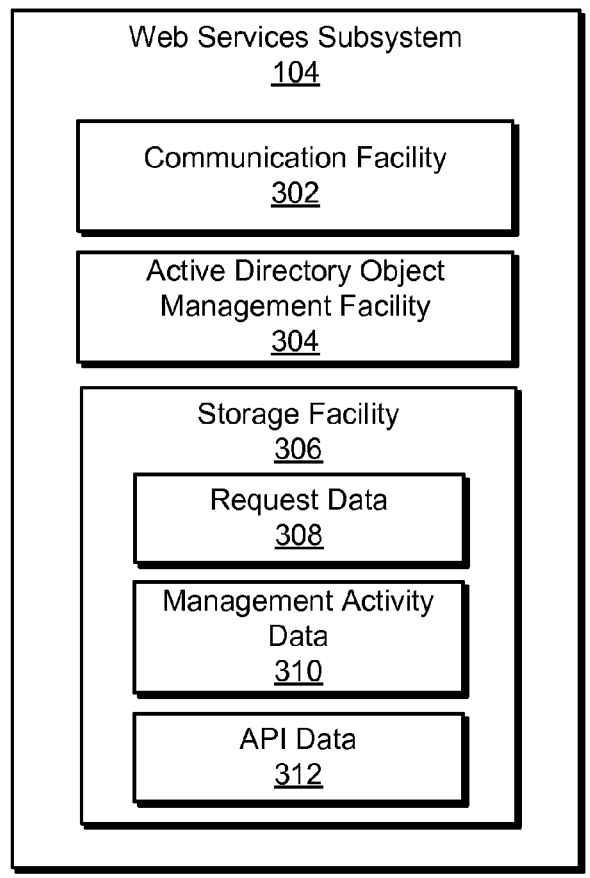
FIG. 3 illustrates exemplary components of a web services subsystem according to principles described herein.

FIG. 3 illustrates exemplary components of web services subsystem 104. As shown in FIG. 3, web services subsystem 104 may include a communication facility 302, an active directory object management facility 304, and a storage facility 306, which may be in communication with one another using any suitable communication technologies. It will be recognized that although facilities 302-306 are shown to be separate facilities in FIG. 3, any of those facilities may be combined into a single facility as may serve a particular application.

Communication facility 302 may be configured to facilitate communication between web services subsystem 104 and web server subsystem 102. For example, communication facility 302 may be configured to receive from web server subsystem 102 data representative of a request to perform a management activity associated with an active directory object. Communication facility 302 may be further configured to transmit notification data to web server subsystem 102 notifying web server subsystem 102 that a management activity has been performed. Communication facility 302 may be configured to utilize any of the communication technologies described herein.

Communication facility 302 may be further configured to facilitate communication between web services subsystem 104 and domain controller subsystem 108. For example, communication facility 302 may be configured to transmit data representative of one or more updates to an active directory maintained by domain controller subsystem 108 to domain controller subsystem 108 in accordance with a performed management activity. In response, communication facility 302 may receive notification from domain controller subsystem 108 that the active directory has been updated in accordance with the performed management activity.

Communication facility 302 may additionally or alternatively be configured to facilitate communication between various components of web services subsystem 104. For example, web services subsystem 104 may include multiple web services servers. Communication facility 302 may be configured to facilitate communication between each of these web services servers.

Active directory object management facility 304 may be configured to perform one or more management activities associated with one or more active directory objects. For example, active directory object management facility 304 may be configured to manage membership of a global group and/or a distribution list. To illustrate, active directory object management facility 304 may be configured to add one or more users to and/or remove one or more users from a global group and/or a distribution list. To this end, active directory object management facility 304 may include or be configured to execute a highly optimized group parsing engine which allows active directory object management facility 304 to parse global groups and/or distribution lists that are relatively very large.

In some examples, as will be described in more detail below, active directory object management facility 304 may be configured to concurrently process any number of transactions as may serve a particular application. For example, multiple users may be concurrently added to a global group and/or a distribution list.

In some examples, active directory object management facility 304 may be configured to utilize industry-standard data types in order to optimize flexibility and interoperability of the management activities performed by active directory object management facility 304. For example, active directory object management facility 304 may be configured to pass data in XML format so that results of the management activities performed by active directory object management facility 304 may be accessed using XML-compliant programming languages and/or applications.

As shown in FIG. 3, storage facility 306 may be configured to maintain request data 308 representative of one or more requests to perform one or more management activities associated with one or more active directory objects as received from web server subsystem 102, management activity data 310 representative of one or more management activities associated with one or more active directory objects as performed by web services subsystem 104, and API data 312 representative of one or more APIs employed by web services subsystem 104. It will be recognized that storage facility 306 may maintain additional or alternative data as may serve a particular application.

Figure 4:
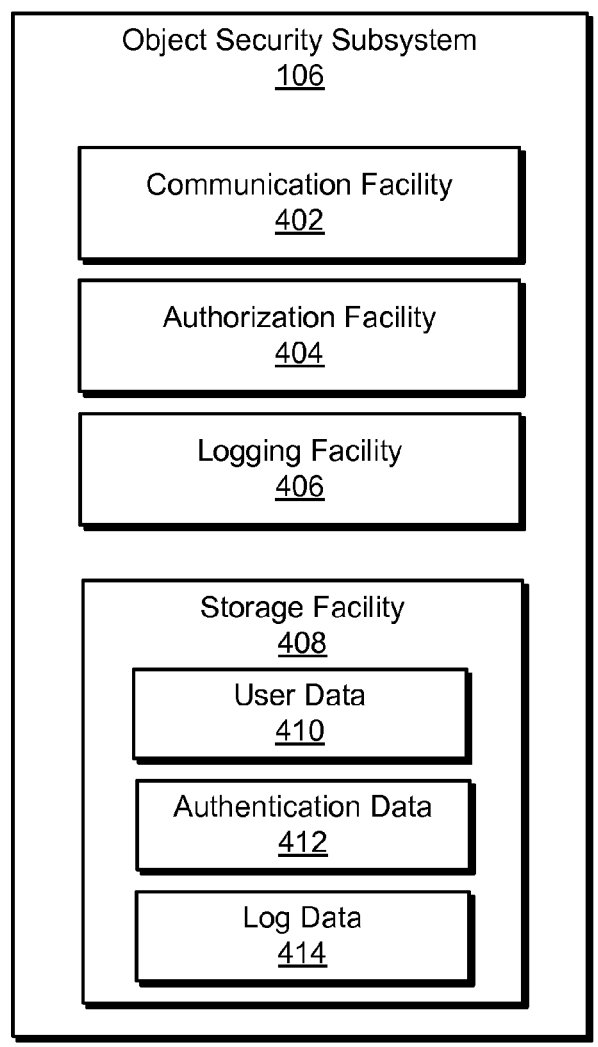
FIG. 4 illustrates exemplary components of an object security subsystem according to principles described herein.

FIG. 4 illustrates exemplary components of object security subsystem 106. As shown in FIG. 4, object security subsystem 106 may include a communication facility 402, an authorization facility 404, a logging facility 406, and a storage facility 408, which may be in communication with one another using any suitable communication technologies. It will be recognized that although facilities 402-408 are shown to be separate facilities in FIG. 4, any of those facilities may be combined into a single facility as may serve a particular application.

Communication facility 402 may be configured to facilitate communication between web server subsystem 102 and object security subsystem 106. For example, communication facility 402 may receive a request to query data representative of authorization relationships between one or more users and an active directory object in order to determine whether a particular end-user is authorized to perform a particular management activity associated with a particular active directory object. In response, communication facility 402 may transmit authorization data to web server subsystem 102 that is representative of whether the end-user is authorized to perform the requested management activity. In some examples, communication facility 402 may be further configured to transmit authentication data representative of one or more authentication parameters necessary to perform a particular management activity.

Authorization facility 404 may be configured to manage data representative of one or more authorization relationships between one or more users and one or more active directory objects. For example, authorization facility 404 may be configured to update the data representative of the one or more authorization relationships in response to a request to change one or more user permissions associated with one or more active directory objects.

Authorization facility 404 may be further configured to facilitate delegation of authority over a particular active directory object. For example, a network administrator may utilize authorization facility 404 to delegate authority over a particular active directory object to a security trustee and/or other administrators. Such delegation of authority will be described in more detail below.

Logging facility 406 may be configured to maintain one or more transaction logs (also referred to herein as "audit trails") associated with one or more management activities performed by web services subsystem 104. Logging facility 406 may be further configured to facilitate automatic reporting of one or more of the transaction logs to one or more users. For example, as will be described in more detail below, logging facility 406 may be configured to automatically generate and send an email to one or more administrators and/or security trustees in response to a management activity performed by web services subsystem 104.

As shown in FIG. 4, storage facility 408 may be configured to maintain user data 410 representative of one or more users, authentication data 412 representative of one or more protocols, network paths, and/or other authentication parameters necessary to establish communication between web services subsystem 104 and domain controller subsystem 108, and log data 414 representative of one or more transaction logs. It will be recognized that storage facility 408 may maintain additional or alternative data as may serve a particular application.

Figure 5:
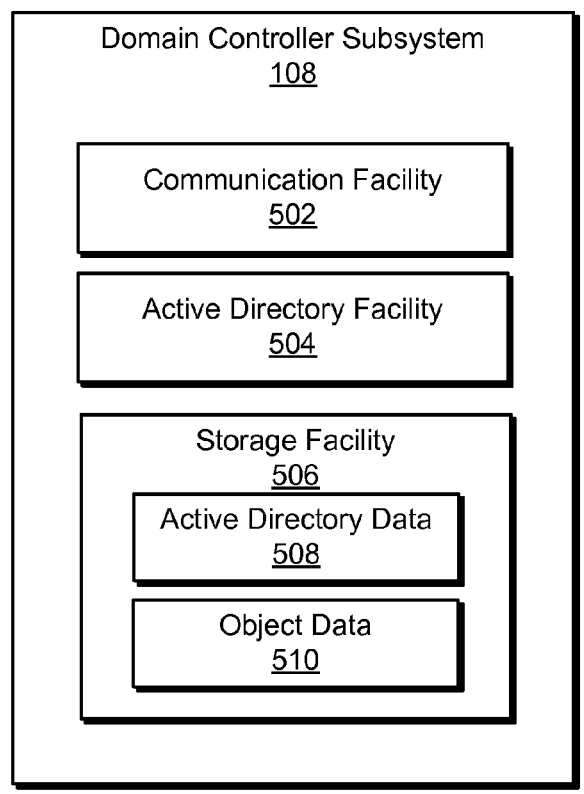
FIG. 5 illustrates exemplary components of a domain controller subsystem according to principles described herein.

FIG. 5 illustrates exemplary components of domain controller subsystem 108. As shown in FIG. 5, domain controller subsystem 108 may include a communication facility 502, an active directory facility 504, and a storage facility 506, which may be in communication with one another using any suitable communication technologies. It will be recognized that although facilities 502-506 are shown to be separate facilities in FIG. 5, any of those facilities may be combined into a single facility as may serve a particular application.

Communication facility 502 is configured to facilitate communication between web services subsystem 104 and domain controller subsystem 108. For example, communication facility 502 may receive data representative of an update to an active directory maintained by domain controller subsystem 108 from web services subsystem 104. Communication facility 502 may additionally be configured to transmit data representative of a notification that the active directory has been updated in response to the update data transmitted thereto by web services subsystem 104.

Active directory facility 504 may be configured to manage an active directory associated with a domain of which domain controller subsystem 108 is a part. The active directory may include one or more active directory objects and may be stored within a database or any other suitable medium.

As shown in FIG. 5, storage facility 506 may be configured to maintain active directory data 508 and object data 510. Active directory data 508 is representative of an active directory managed by active directory facility 504. Object data 510 is representative of one or more active directory objects included within the active directory managed by active directory facility 504.

Figure 6:
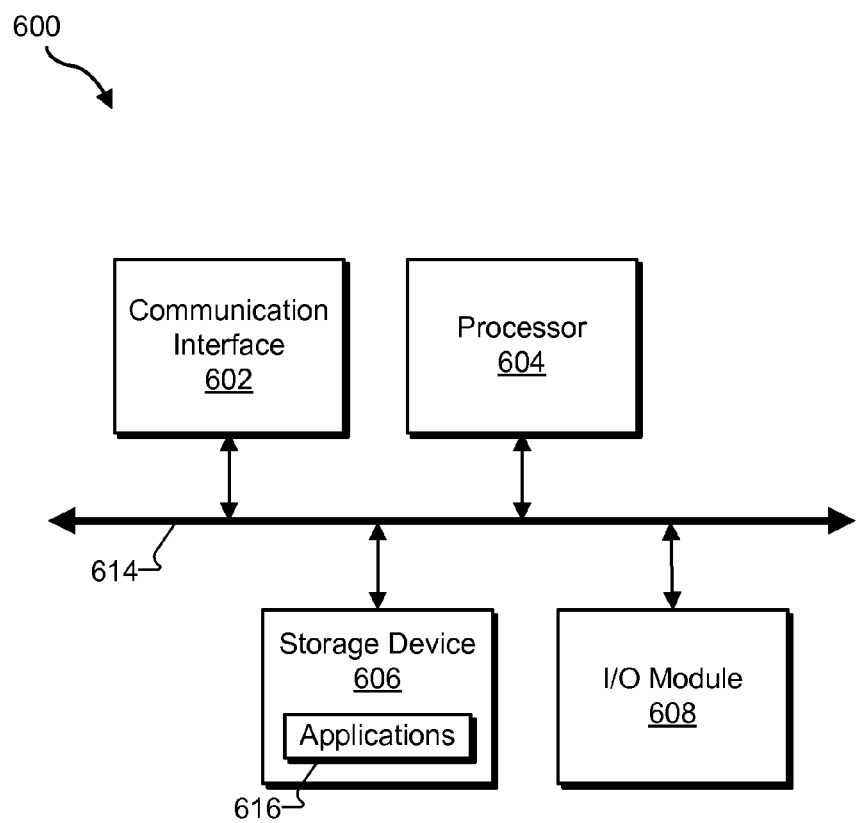
FIG. 6 illustrates an exemplary computing device according to principles described herein.

FIG. 6 illustrates an exemplary computing device 600 that may have any combination of web server subsystem 102, web services subsystem 104, object security subsystem 106, and/or domain controller subsystem 108 implemented thereon. Computing device 600 may include one or more of a server, a personal computer, a communications device, and/or any other computing device configured to perform one or more of the processes and/or operations described herein.

As shown in FIG. 6, computing device 600 may include a communication interface 602, a processor 604, a storage device 606, and an I/O module 608 in communicatively connected to one another via a communication infrastructure 614. While an exemplary computing device 600 is shown in FIG. 6, the components illustrated in FIG. 6 are not intended to be limiting. Additional or alternative components may be used in other embodiments. Components of computing device 600 shown in FIG. 6 will now be described in additional detail.

Communication interface 602 may be configured to communicate with one or more computing devices. In particular, communication interface 602 may be configured to transmit and/or receive one or more messages, encryption configuration data, communication signals, and/or other data. Examples of communication interface 602 include, without limitation, a wired network interface (such as a network interface card), a wireless network interface (such as a wireless network interface card), a modem, and any other suitable interface. In at least one embodiment, communication interface 602 may provide a direct connection between two or more of subsystems 102-108 via a direct link to a network, such as the Internet. Communication interface 602 may additionally or alternatively provide such a connection through, for example, a local area network (such as an Ethernet network), a personal area network, a telephone or cable network, a cellular telephone connection, a satellite data connection, a dedicated URL, or any other suitable connection. Communication interface 602 may be configured to interface with any suitable communication media, protocols, and formats, including any of those mentioned above.

Processor 604 generally represents any type or form of processing unit capable of processing data or interpreting, executing, and/or directing execution of one or more of the instructions, processes, and/or operations described herein. Processor 604 may direct execution of operations in accordance with one or more applications 616 or other computer-executable instructions such as may be stored in storage device 606 or another computer-readable medium.

Storage device 606 may include one or more data storage media, devices, or configurations and may employ any type, form, and combination of data storage media and/or device. For example, storage device 606 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 606. For example, data representative of one or more executable applications 616 (which may include, but are not limited to, one or more of the software applications described herein) configured to direct processor 604 to perform any of the operations described herein may be stored within storage device 606. In some examples, data may be arranged in one or more databases residing within storage device 606.

I/O module 608 may be configured to receive user input and provide user output and may include any hardware, firmware, software, or combination thereof supportive of input and output capabilities. For example, I/O module 608 may include hardware and/or software for capturing user input, including, but not limited to, a keyboard or keypad, a touch screen component (e.g., touch screen display), a receiver (e.g., an RF or infrared receiver), and/or one or more input buttons.

I/O module 608 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 608 is configured to provide graphical data to a display for presentation to a user. The graphical data may be representative of one or more web-based interfaces (e.g., web pages), graphical user interfaces ("GUIs"), and/or any other view as may serve a particular application.

In some examples, any of the facilities described herein may be implemented by or within one or more components of computing device 600. For example, one or more applications 616 residing within storage device 606 may be configured to direct processor 604 to perform one or more processes or functions associated with communication facility 202, web interface facility 204, communication facility 302, active directory object management facility 304, communication facility 402, authorization facility 404, logging facility 406, communication facility 502, and/or active directory facility 504. Likewise, storage facility 206, storage facility 306, storage facility 408, and/or storage facility 506 may be implemented by or within storage device 606.

Figure 7:
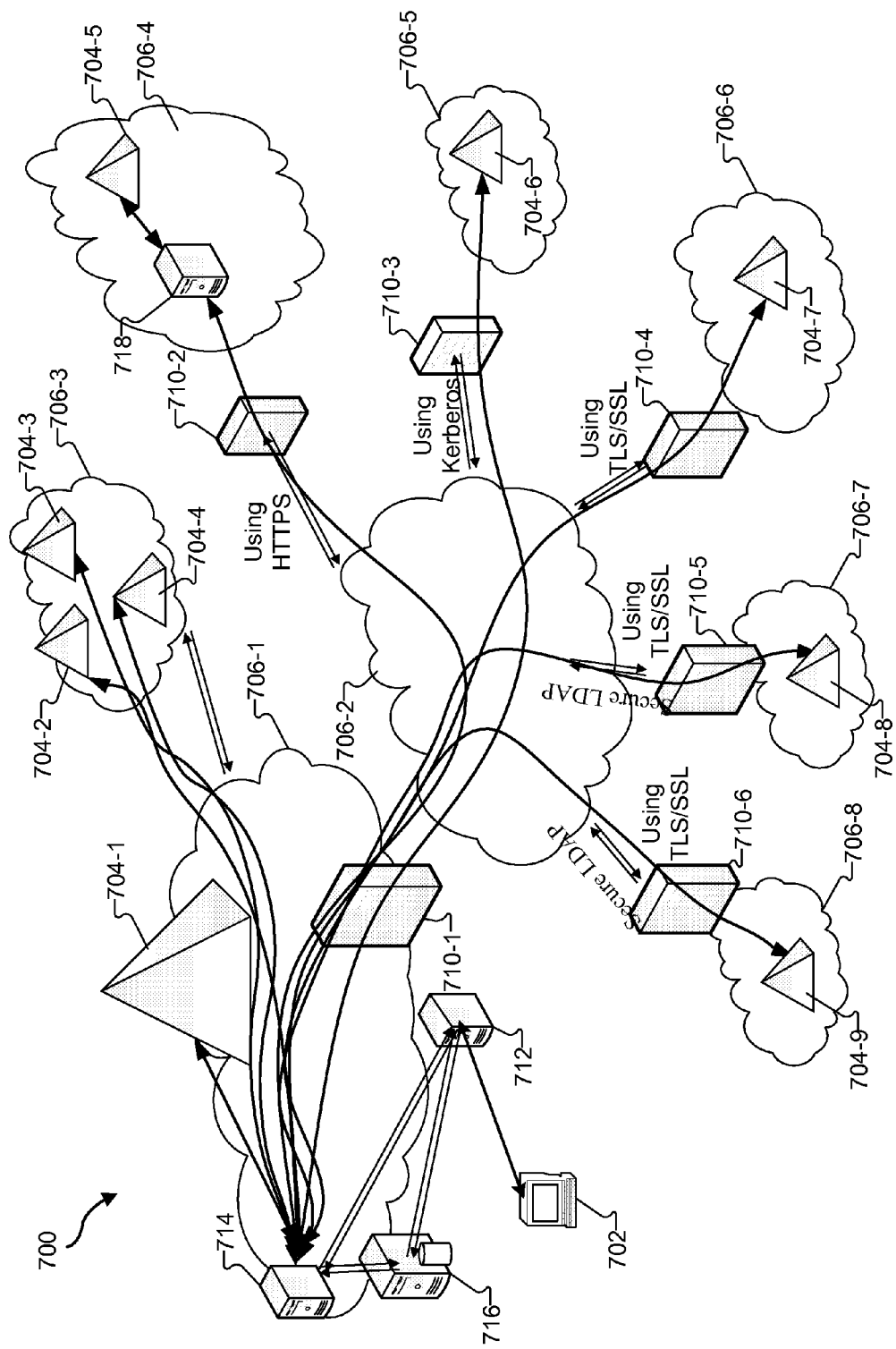
FIG. 7 illustrates an exemplary implementation of the system of FIG. 1 according to principles described herein.

FIG. 7 illustrates an exemplary implementation 700 of system 100 wherein an authorized end-user of a client device 702 may perform one or more management activities associated with one or more active directory objects included within a plurality of different domains 704 (e.g., domains 704-1 through 704-9). FIG. 7 shows that each of the domains 704 may be located within different network platforms 706 (e.g., network platforms 706-1 through 706-8). Some of the domains (e.g., domains 704-5 through 704-9) may be protected by one or more firewalls 710 (e.g., firewalls 710-1 through 710-6) and require various secure communication protocols and/or connections to communicate therewith. Some of the domains (e.g., domains 704-2 through 704-4) may be not be protected by one or more firewalls 710.

To facilitate access by an end-user to one or more active directory objects included within one or more of the domains (e.g., domain 704-5), a web server 712, a web services server 714, an object security server 716, and a domain controller 718 associated with domain 704-5 may be provided. Web server subsystem 102 may be implemented on web server 712, web services subsystem 104 may be implemented on web services server 714, object security subsystem 106 may be implemented on object security server 716, and domain controller subsystem 108 may be implemented on domain controller 718. A single domain controller 718 associated with domain 704-5 is shown in FIG. 7 for illustrative purposes only. It will be recognized that each of the other domains 704 shown in FIG. 7 may have one or more domain controllers 708 associated therewith.

As mentioned, the implementation 700 shown in FIG. 7 is configured to allow an authorized end-user of client device 702 to perform a management activity associated with an active directory object included within one of the domains 704. For example, an end-user of client device 702 may desire to add a user to a global group within domain 704-5. To this end, web server 712 may provide a web-based interface for display on client device 702. The end-user may input a logon account name of the desired user into the web-based interface and then select an option within the web-based interface to initiate a request to add the user to the global group.

In response, web server 712 transmits a request to object security server 716 to determine whether the end-user is authorized to add the user to the global group within domain 704-5. If the end-user is authorized to add the user to the global group, object security server 716 may transmit authorization data to web server 712 indicating that the end-user is authorized to add the user to the global group. Authentication data, including one or more communication protocols and/or network paths required to communicate with domain controller 718 (which maintains the active directory associated with domain 704-5) may additionally be transmitted by object security server 716 to web server 712.

Web server 712 may then transmit the request to add the user to the global group and the authentication data to web services server 714. Web services server 714 may then initiate a communication session with domain controller 718 in accordance with the authentication data and add the user to the global group. Web services server 714 may additionally update in real-time the active directory maintained by the domain controller 718 to reflect that the user has been added to the global group.

In some examples, web services server 714 may transmit results data to web server 712 indicating that the user has been successfully added to the global group. In response, web server 712 may submit a request back to web services server 714 to enumerate the global group so that an updated listing of the global group may be displayed within the web-based interface displayed on client device 702. Web services server 714 may enumerate the global group in response to the request and return data representative of the enumerated global group to web server 712. This data may be used to render an updated listing of the global group within the web-based interface displayed on client device 702.

It will be recognized that the management activity described in connection with FIG. 7 is merely illustrative of the many different management activities that may be initiated by an end user of client device 702 and performed in accordance with the systems and methods described herein. Additional examples of management activities will be described in more detail below.

Figure 8:
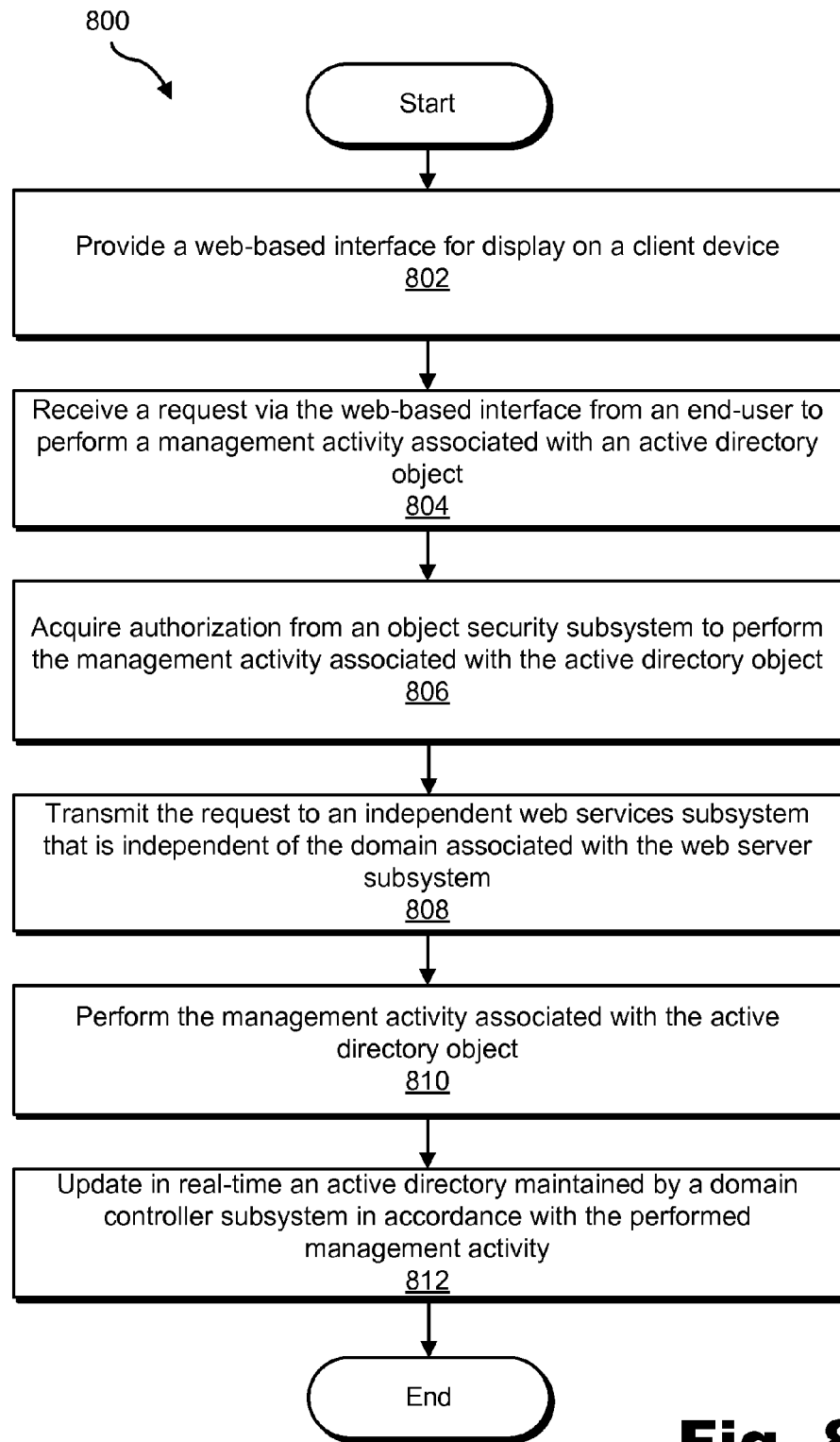
FIG. 8 illustrates an exemplary active directory object management method according to principles described herein.

FIG. 8 illustrates an exemplary active directory object management method 800. As will be described below, method 800 facilitates real-time performance of one or more management activities associated with one or more active directory objects. While FIG. 8 illustrates exemplary steps according to one embodiment, other embodiments may omit, add to, reorder, and/or modify any of the steps shown in FIG. 8.

In step 802, a web-based interface is provided for display on a client device. Step 802 may be performed by web server subsystem 102, for example. The web-based interface may include a webpage and/or any other type of web-based interface as may serve a particular application. The web-based interface may be configured to facilitate initiation by an end-user of one or more management activities associated with one or more active directory objects. Examples of such web-based interfaces will be described in more detail below.

In step 804, a request is received via the web-based interface from an end-user to perform a management activity associated with an active directory object. The request may be received by web server subsystem 102, for example. Various management activities associated with an active directory object that may be requested will be described in more detail below.

In step 806, authorization is acquired from an object security subsystem to perform the management activity associated with the active directory object. For example, web server subsystem 102 may query object security subsystem 106 to determine whether the end-user has authority to perform the requested management activity. If object security subsystem 106 determines that the end-user is authorized to perform the management activity, object security subsystem 106 may transmit authorization data to web server subsystem 102 indicating that the end-user is authorized to perform the management activity. In some examples, object security subsystem 106 may additionally transmit authentication data to web server subsystem 102.

In step 808, the request to perform the management activity is transmitted to an independent web services subsystem that is independent of the domain associated with the web server subsystem. For example, web server subsystem 102 may transmit data representative of the request to perform the management activity to web services subsystem 104 over any suitable communication link.

In step 810, the management activity associated with the active directory object is performed. In some examples, web services subsystem 104 is configured to perform the management activity. Exemplary management activities that may be performed by web services subsystem 104 will be described in more detail below.

In step 812, an active directory managed by a domain controller subsystem is updated in real-time in accordance with the performed management activity. For example, web services subsystem 104 may transmit to domain controller subsystem 108 data representative of one or more updates to the active directory in accordance with the management activity that is performed in step 810.

Various examples of management activities that may be requested by an end-user and performed by web services subsystem 104 will now be described. It will be recognized that the management activities described herein are merely illustrative of the many different management activities that may be performed in accordance with the systems and methods described herein.

In some examples, an end-user may desire to perform one or more management activities associated with a global group. For example, the end-user may desire to add one or more users and/or other active directory objects to the global group. Additionally or alternatively, the end-user may desire to remove one or more users and/or other active directory objects from the global group.

Figure 9:
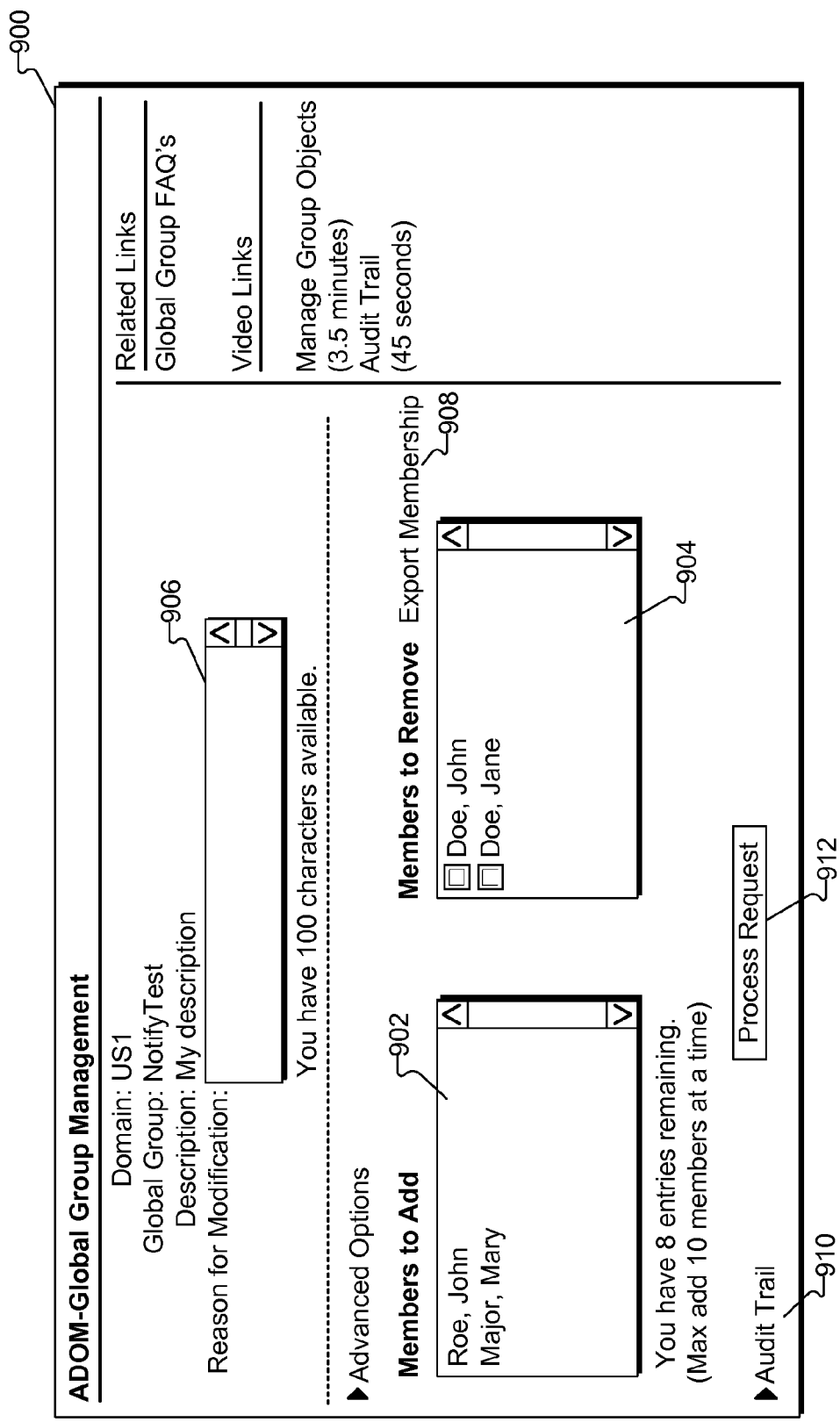
FIG. 9 illustrates an exemplary web-based interface according to principles described herein.

FIG. 9 illustrates an exemplary web-based interface 900 that may be displayed on a client device associated with an end-user and that is configured to facilitate initiation by the end-user of one or more management activities associated with a global group. As shown in FIG. 9, web-based interface 900 may include input boxes 902 and 904, which allow for direct manipulation of membership within a global group.

For example, box 902 is entitled "Members to Add" and includes a free-form text box where names of one or more users may be entered to add the one or more users to the global group. The names of the users may be entered in any suitable manner as may serve a particular application. For example, the first and last names of the users may be entered, as shown in FIG. 9. A logon account name, email address, employee number, and/or any other identifying text string may be alternatively entered into box 902 to identify one or more users to be added to the global group.

As shown in FIG. 9, box 904 is entitled "Members to Remove" and may include a list of the current members of the global group. The end-user may select one or more of the users included within the list of members to remove those users from the global group. For example, box 904 shows that there are currently two members of the global group. One or more of these members may be removed from the global group by selecting appropriate checkboxes displayed within box 904.

In some examples, the end-user may be required to input a reason for the modification to the global group. The reason may be input into text box 906, for example. In this manner, a record of why each change is made to the global group may be kept and/or reported during an audit.

As shown in FIG. 9, an "export membership" link 908 may be displayed within web-based interface 900. Link 908 may be selected by the end-user to generate a report of the current membership of the global group and email the report to the end-user and/or any other user (e.g., a security trustee and/or an administrator) as may serve a particular application.

Figure 10:
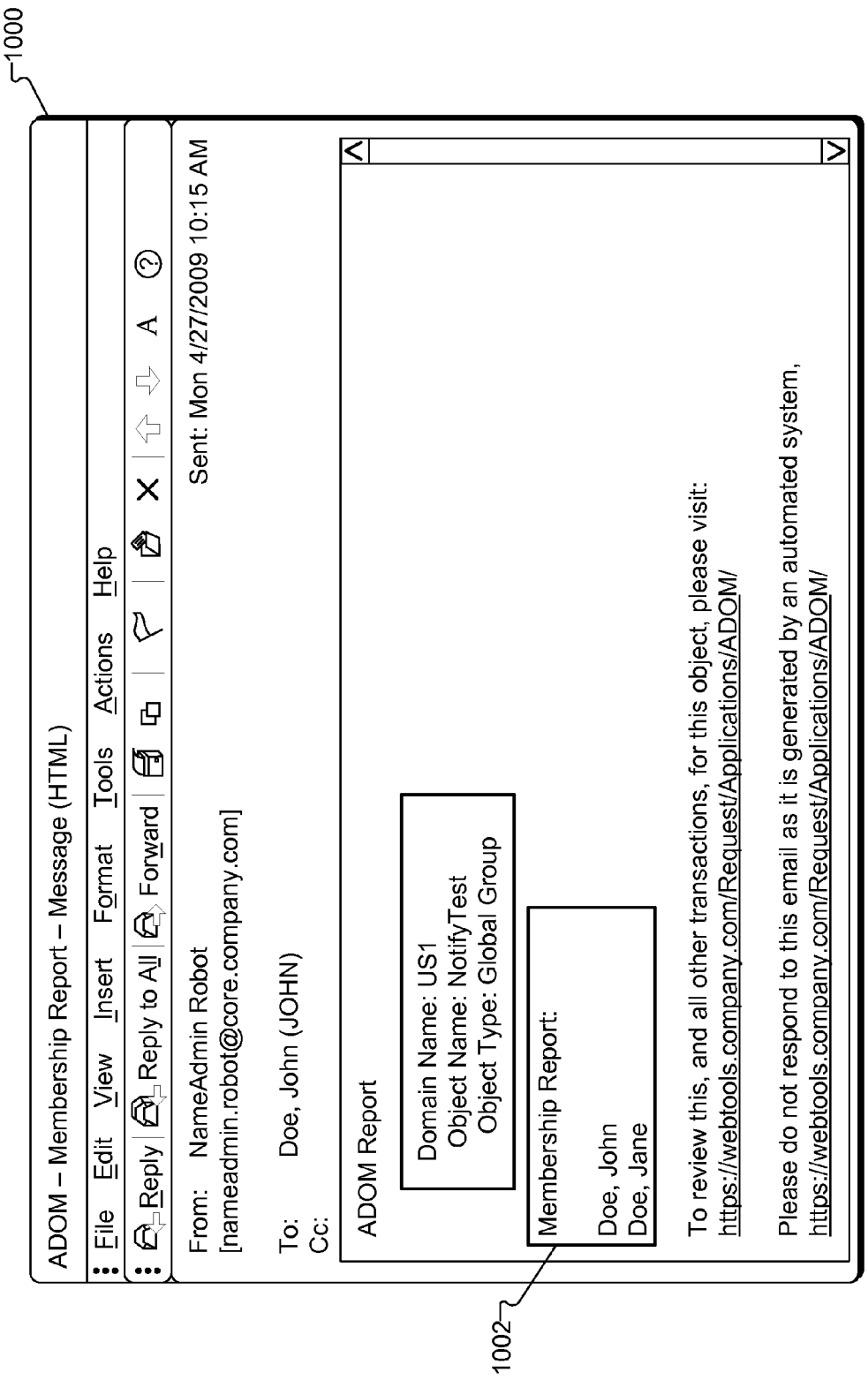
FIG. 10 illustrates an exemplary email that may be automatically generated when an export membership link included within the web-based interface of FIG. 9 is selected according to principles described herein.

FIG. 10 illustrates an exemplary email 1000 that may be automatically generated when the export membership link 908 is selected. As shown in FIG. 10, email 1000 may include a membership report 1002 listing all the members of the global group. The membership report 1002 may display the global group membership in any suitable format. For example, as shown in FIG. 10, the membership report 1002 may display the members' container name value. Additionally or alternatively, the members' email addresses, company identification numbers, and/or any other identifying information may be displayed within membership report 1002.

Returning to FIG. 9, an "audit trail" link 910 may additionally or alternatively be displayed within web-based interface 900. Audit trail link 910 may be selected by the end-user to display and/or email an audit trail associated with one or more management activities previously performed in association with the global group. For example, the end-user may desire to view all of the additions and removals that have been made to the global group within a certain time range. The end-user may select audit trail link 910 to display and/or email an audit trail containing the desired information.

After the end-user has input the names of one or more users into the "members to add" box 902 and/or selected the names of one or more users within the "members to remove" box 904, the end-user may select a "process request" link 912 in order to submit a request to add the one or more users to and/or remove the one or more users from the global group.

As mentioned, web services subsystem 104 may be configured to concurrently process any number of transactions. For example, if the end-user has input multiple users into the "members to add" box 902 and/or selected multiple users within the "members to remove" box 904, web services subsystem 104 may perform a bulk update to update the global group accordingly. Alternatively, web services subsystem 104 may be configured to process each request individually.

In some examples, the end-user may desire to perform one or more management activities associated with a distribution list. For example, the end-user may desire to add one or more users to the distribution list. Additionally or alternatively, the end-user may desire to remove one or more users from the distribution list.

Figure 11:
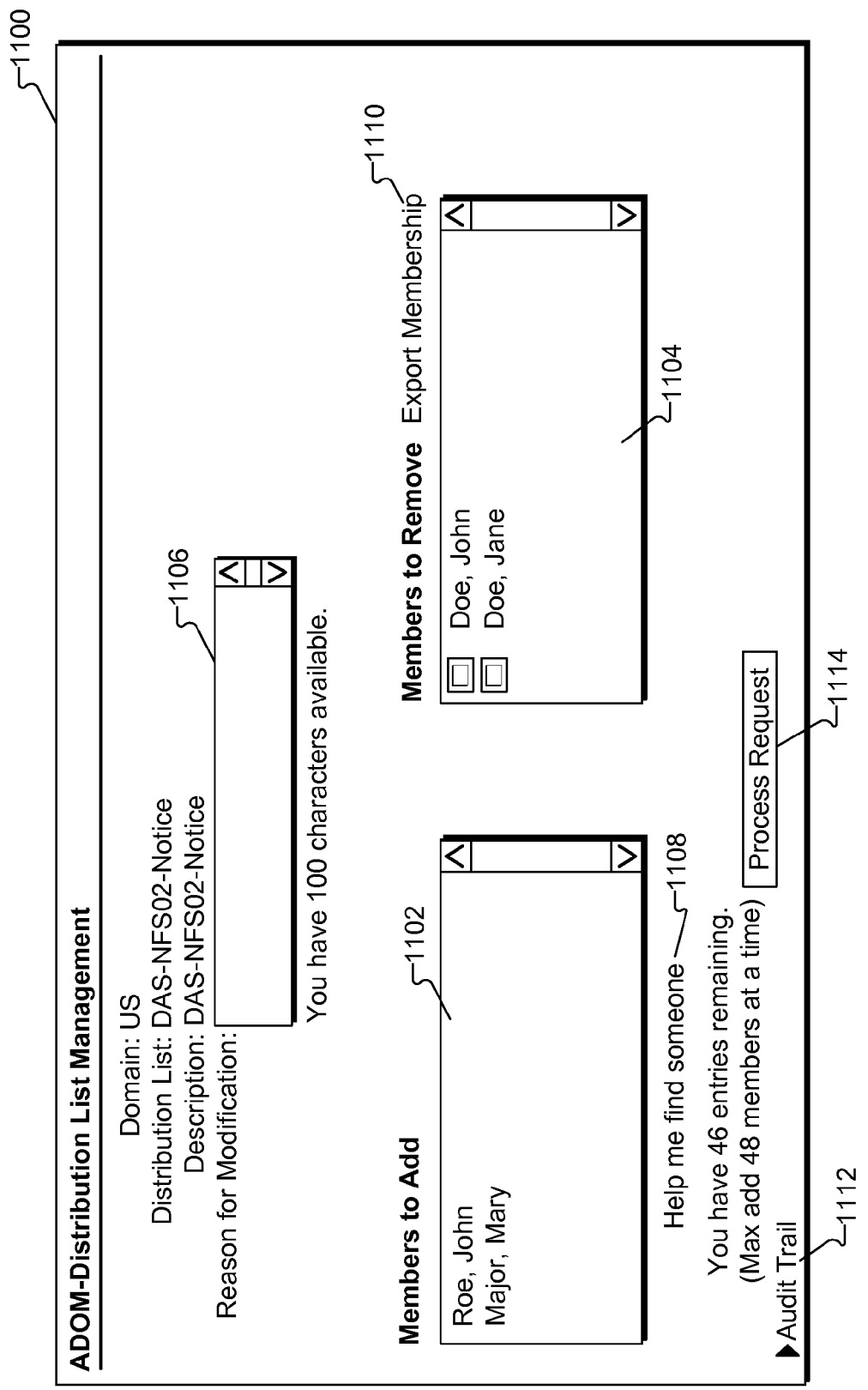

FIG. 11 illustrates an exemplary web-based interface 1100 that may be displayed on a client device associated with an end-user and that is configured to facilitate initiation by the end-user of one or more management activities associated with an active directory object. As shown in FIG. 11, web-based interface 1100 may include input boxes 1102 and 1104 similar to input boxes 902 and 904 described in FIG. 9 that may be used to add one or more users to and/or remove one or more users from a distribution list. Text box 1106 may be used to input one or more reasons for modifying the distribution list.

In some examples, a link, such as the "help me find someone" link 1108, may be provided to assist the end-user in locating one or more users to add to the distribution list. Link 1108, when selected, may be configured to open a search tool in a new window to help the end-user find one or more users to add to the distribution list. For example, the search tool may search a Microsoft exchange mailbox and/or a Microsoft exchange contact list in a Microsoft exchange global address list ("GAL") for one or more users that the end-user may desire to add to the distribution list.

Various other options may also be displayed within web-based interface 1100. For example, an "export membership" link 1110 and/or an "audit trail" link 1112 may be displayed within web-based interface 1100. A "process request" link 1114 may be displayed within web-based interface 1100 and selected to submit a request to add the one or more users to and/or remove the one or more users from the distribution list.

Figure 12:
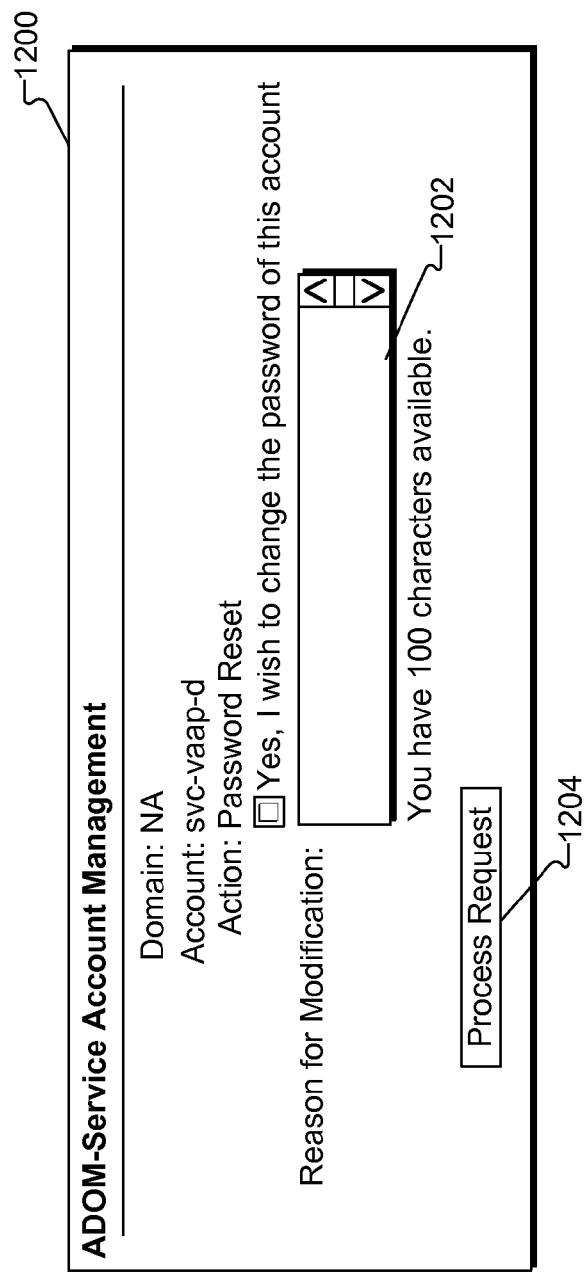

In some examples, the end-user may desire to perform one or more management activities associated with a service account corresponding to a particular user. For example, the end-user may desire to reset a password used to access the service account. FIG. 12 illustrates an exemplary web-based interface 1200 that may be displayed on a client device associated with an end-user and that is configured to facilitate resetting of a password associated with a particular service account. One or more reasons for resetting the password may be entered into text box 1202. To process the password reset request, a "process request" link 1204 may be selected. In response, a new password may be automatically generated by object security subsystem 106 and/or by any other subsystem or device. The new password may then be displayed within web-based interface 1200.

In some examples, the end-user may desire to perform one or more management activities associated with administrative authority over an active directory object. For example, the end-user may desire to assign administrative authority over an active directory object to one or more users. To illustrate, a network administrator may desire to delegate authority over a particular active directory object (e.g., a global group) to a security trustee. The security trustee is then responsible for all management activities performed in relation to the active directory object.

A security trustee may delegate limited authority over the active directory object to one or more administrators. For example, a security trustee may allow one or more administrators to perform day to day maintenance of an active directory object. To facilitate monitoring by the security trustee of such activities, an email notification may be sent to the security trustee any time a management activity is performed in relation to the active directory object. The email notification may include a name of the user performing the management activity, a time stamp of the management activity, a description of the management activity, an IP address of the computing device used to perform the management activity, and/or any other information associated with the management activity as may serve a particular application.

To further ensure that an active directory object is properly maintained, the security trustee may be required to periodically review and certify that the active directory object is accurate and still needed. The security trustee may additionally or alternatively be required to review and certify the authoritative rights over the active directory object that have been delegated to administrators. For example, the security trustee may be required to periodically (e.g., quarterly) review a list of administrators associated with a particular active directory object and certify that the list is accurate and complete. If the certification is not completed by the security trustee, the active directory object may be inactivated or deleted.

In some examples, object security subsystem 106 may be configured keep track of which users are assigned as security trustees and/or administrators. For example, data representative of such designations may be stored within user data 410. In some examples, object security subsystem 106 may be configured to receive human resources ("HR") data on a periodic basis and/or in response to a certain event (e.g., designation of one or more security trustees and/or administrators). The HR data may be used to determine whether there has been a change in employment status for one or more security trustees and/or administrators. If there has been such a change, object security subsystem 106 may be configured to automatically reassign one or more authoritative roles to one or more users.

For example, if the HR data indicates that a user having an administrator role has left the company, object security subsystem 106 may be configured to automatically revoke administrator privileges from the departed user. If the HR data indicates that a user having a security trustee role has left the company, object security subsystem 106 may be configured to automatically designate another user (e.g., a manager of the security trustee) as the new security trustee.

FIG. 13 illustrates an exemplary web-based interface 1300 that may be used as an active directory object management homepage for a particular end-user. As shown in FIG. 13, web-based interface 1300 may list one or more active directory objects for which the end-user has been designated as an administrator or as a security trustee. In some examples, the end-user may select one or more of the listed objects in order to perform one or more management activities associated therewith.

Figure 14:
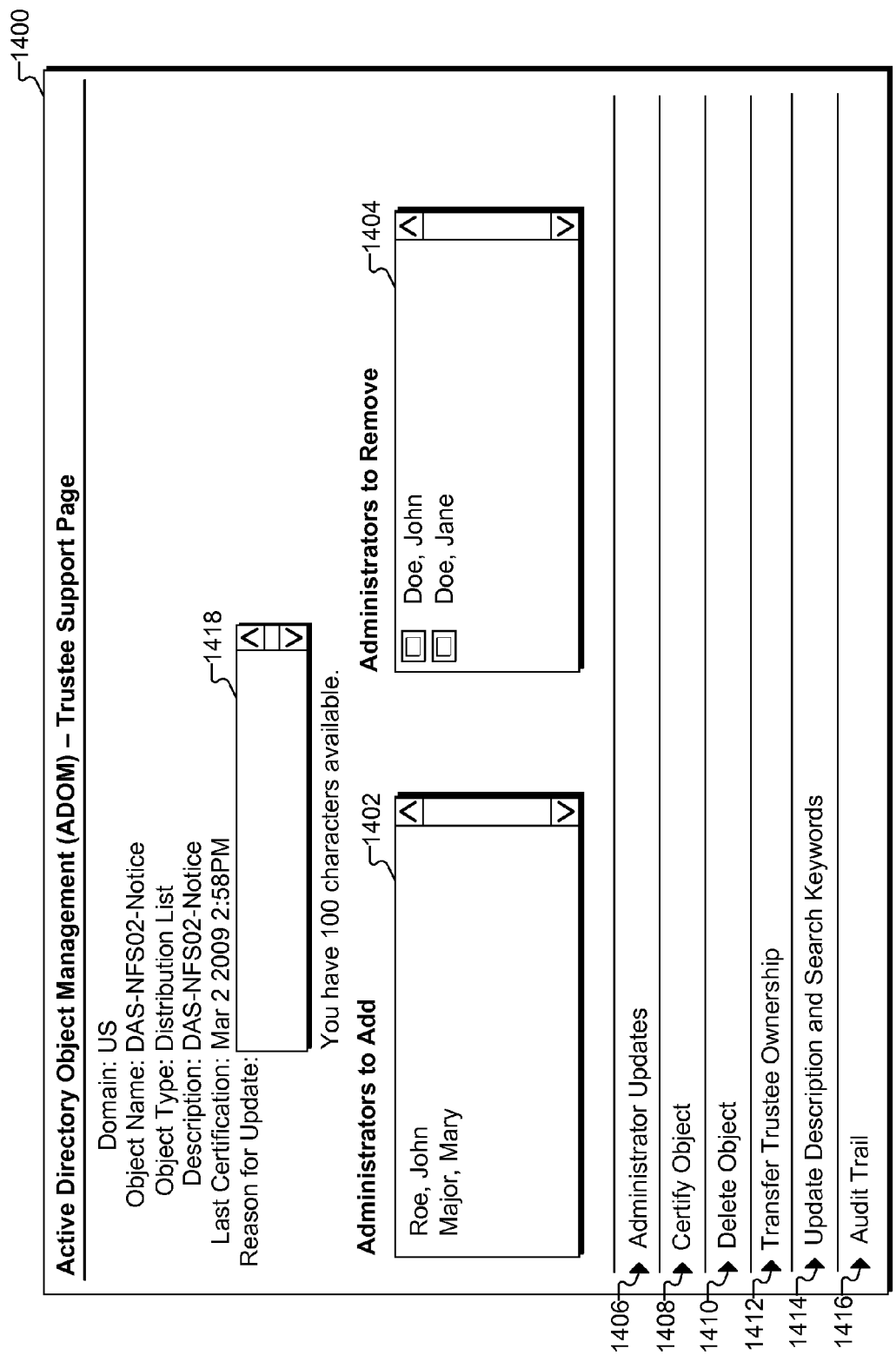

FIG. 14 illustrates an exemplary web-based interface 1400 that may be used by a security trustee to manage a particular active directory object. In the example of FIG. 14, the active directory object comprises a distribution list for illustrative purposes only. It will be recognized that the active directory object associated with web-based interface 1400 may alternately include any other active directory objet as may serve a particular application.

As shown in FIG. 14, a security trustee may assign one or more administrators to the distribution list using input box 1402 and/or remove one or more administrators from the distribution list using input box 1404. The security trustee may additionally or alternatively select link 1406 to perform one or more additional administrator updates, link 1408 to certify the distribution list, link 1410 to delete the distribution list, link 1412 to transfer security trustee ownership to another user, link 1414 to update a description and/or one or more search keywords associated with the distribution list, and/or link 1416 to access an audit trail associated with the distribution list. In some examples, the security trustee may be required to input a reason for making any updates to the distribution list using text box 1418. A number of these options will now be described in more detail below.

FIG. 15 shows web-based interface 1400 after link 1408 has been selected to certify the distribution list. As mentioned, a security trustee may be required to periodically review and certify that an active directory object is accurate and still needed. In some examples, the security trustee may utilize web-based interface 1400 to perform the certification process. For example, the security trustee may select link 1408 to access certification information corresponding to the distribution list. Once the distribution list has been reviewed, the security trustee may select a "certify object" link 1502 to complete the certification process.

In some examples, one or more reminder emails may be automatically generated and sent to the security trustee prompting the security trustee to certify an active directory object. Additional follow up, including automatically generated phone calls and the like, may also be used if a security trustee fails to certify an active directory object in a timely manner.

FIG. 16 shows web-based interface 1400 after link 1412 has been selected to transfer the role of security trustee from one user to another. Such a transfer may be desirable for many reasons. For example, if a security trustee receives a different assignment or quits his or her job, the security trustee role may be transferred to another user. In some examples, as shown in FIG. 16, the outgoing security trustee may input an employee identification number or other identifier into text box 1602 and then select a "transfer ownership" link 1604 to transfer the role of security trustee to another user. An email may be automatically sent to the nominee informing him or her about the transfer request and providing a link that may be accessed to either approve or deny the transfer request.

FIG. 17 illustrates an exemplary web-based interface 1700 that may be displayed on a client device associated with a user nominated to become a security trustee. As shown in FIG. 17, the user may be presented with a description of the security trustee transfer request, an option to accept the designation, and an option to deny the designation. In some examples, an email is automatically sent to the nominating security trustee informing him or her of the nominee's decision.

FIG. 18 illustrates an exemplary web-based interface 1800 that may be displayed on a client device in response to an end-user selection of audit trail link 1416 shown in FIG. 14. As shown in FIG. 18, one or more transaction logs associated with the distribution list may be displayed within web-based interface 1800. The audit trail may be emailed to the security trustee and/or any other user by selecting link 1802. In some examples, one or more of the transaction logs may be maintained for a predetermined amount of time for use in one or more auditing procedures.

In some examples, an end-user may utilize a web-based interface to create a new active directory object. FIG. 19 shows an exemplary web-based interface 1900 that may be used to create a new active directory object. As shown in FIG. 19, one or more parameters associated with the new active directory object may be defined by the end-user using web-based interface 1900.

FIG. 20 illustrates an exemplary web-based interface 2000 that includes a public search tool that may be used by one or more users to find one or more responsible parties for a specific active directory object. For example, an object name may be input into web-based interface 2000 to access an email address and/or other contact information corresponding to a security trustee and/or administrator associated with the active directory object. The security trustee and/or administrator may then be contacted to request access to the active directory object.

As detailed above, the methods and systems described herein facilitate management of one or more active directory objects. As an example, an exemplary method includes providing, by a web server subsystem, a web-based interface for display on a client device within a domain associated with the web server subsystem, receiving, by the web server subsystem, a request via the web-based interface from an end-user to perform a management activity associated with an active directory object, acquiring, by the web server subsystem, authorization from an object security subsystem to perform the management activity associated with the active directory object, transmitting, by the web server subsystem, the request to a web services subsystem that is independent of the domain associated with the web server subsystem, performing, by the web services subsystem, the management activity associated with the active directory object, and updating in real-time, by the web services subsystem, an active directory maintained by a domain controller subsystem in accordance with the performed management activity.

Another exemplary method includes providing, by a web server subsystem, a web-based interface for display on a client device, receiving, by the web server subsystem, a request via the web-based interface from an end-user to perform a management activity associated with an active directory object, acquiring, by the web server subsystem, authentication from an authentication subsystem to perform the management activity associated with the active directory object, transmitting, by the web server subsystem, the request to an independent web services subsystem, the web services subsystem configured to perform the management activity associated with the active directory object, and recording, by the web server subsystem, a transaction log representative of the performed management activity within a database maintained by the object security subsystem.

An exemplary system includes a web server subsystem configured to provide a web-based interface for display on a client device and an independent web services subsystem selectively and communicatively coupled to the web server subsystem. The web server subsystem is further configured to receive a request via the web-based interface from an end-user to perform a management activity associated with an active directory object, acquire from an object security subsystem authorization to perform the management activity associated with the active directory object, and transmit the request to the web services subsystem. The web services subsystem is configured to perform the management activity associated with the active directory object and update in real-time an active directory maintained within an active directory database in accordance with the performed management activity.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   providing, by a web server subsystem that is part of a first domain, a web-based interface for display on a client device;
   receiving, by the web server subsystem, a request via the web-based interface from an end-user to perform a management activity that creates or modifies active directory object;
   acquiring, by the web server subsystem, authorization from an object security subsystem to ensure that the end-user is authorized to perform the management activity that creates or modifies the active directory object;
   transmitting, by the web server subsystem, the request to perform the management activity that creates or modifies the active directory object to a web services subsystem that is part of a second domain independent of the first domain;
   performing, by the web services subsystem that is part of the second domain, the management activity that creates or modifies the active directory object; and
   updating in real-time, by the web services subsystem that is part of the second domain, an active directory maintained by a domain controller subsystem in accordance with the performed management activity such that the updated active directory is accessible to the client device substantially immediately upon completion of the real-time update.

2. The method of claim 1, wherein the active directory object comprises a global group, and wherein the management activity comprises at least one of adding one or more users to the global group and removing one or more users from the global group.

3. The method of claim 1, wherein the active directory object comprises a distribution list, and wherein the management activity comprises at least one of adding one or more users to the distribution list and removing one or more users from the distribution list.

4. The method of claim 1, wherein the active directory object comprises a service account associated with a user, and wherein the management activity comprises modifying one or more settings associated with the service account.

5. The method of claim 1, wherein the management activity comprises enumerating the active directory object.

6. The method of claim 1, wherein the management activity comprises assigning administrative authority over the active directory object to one or more users.

7. The method of claim 1, further comprising maintaining, by the object security subsystem, data representative of one or more authorization relationships between one or more users and the active directory object.

8. The method of claim 7, wherein the acquiring of authorization from the object security subsystem comprises determining whether the end-user has authorization to perform the management activity that creates or modifies the active directory object based on the data representative of the one or more authorization relationships maintained by the object security subsystem.

9. The method of claim 1, wherein the acquiring of authorization from the object security subsystem comprises acquiring one or more communication protocols and network paths used to access the active directory object.

10. The method of claim 1, further comprising recording a transaction log that indicates successful completion of the performed management activity within the object security subsystem.

11. The method of claim 10, further comprising automatically notifying one or more users of the transaction log.

12. The method of claim 10, further comprising maintaining the transaction log for a predetermined amount of time for use in an auditing procedure.

13. The method of claim 1, further comprising:
   receiving, by the web server subsystem, notification of the performed management activity; and
   providing, by the web server subsystem, data representative of one or more results of the performed management activity for display within the web-based interface.

14. The method of claim 1, wherein a domain of the web server subsystem is untrusted.

15. A method comprising: providing, by a web server subsystem that is part of a first domain, a web-based interface for display on a client device; receiving, by the web server subsystem, a request via the web-based interface from an end-user to perform a management activity that creates or modifies an active directory object;
   acquiring, by the web server subsystem, authentication from an object security subsystem to ensure that the end-user is authorized to perform the management activity that creates or modifies the active directory object;
   transmitting, by the web server subsystem, the request to perform the management activity that creates or modifies the active directory object to a web services subsystem that is part of a second domain independent of the first domain, the web services subsystem configured to perform the management activity that creates or modifies the active directory object and update in real-time an active directory maintained by a domain controller subsystem in accordance with the performed management activity such that the updated active directory is accessible to the client device substantially immediately upon completion of the real-time update; and recording, by the web server subsystem, a transaction log that indicates successful completion of the performed management activity within a database maintained by the object security subsystem.

16. The method of claim 15, wherein the active directory object comprises a global group, and wherein the management activity comprises at least one of adding one or more users to the global group and removing one or more users from the global group.

17. The method of claim 15, wherein the active directory object comprises a distribution list, and wherein the management activity comprises at least one of adding one or more users to the distribution list and removing one or more users from the distribution list.

18. The method of claim 15, wherein the management activity comprises assigning administrative authority over the active directory object to one or more users.

19. A system comprising:
a web server subsystem that is part of a first domain and configured to provide a web-based interface for display on a client device; and
a web services subsystem that is part of a second domain independent of the first domain and selectively and communicatively coupled to the web server subsystem;
wherein the web server subsystem that is part of the first domain is further configured to
receive a request via the web-based interface from an end-user to perform a management activity that creates or modifies an active directory object,
acquire from an object security subsystem authorization to ensure that the end-user is authorized to perform the management activity that creates or modifies the active directory object, and
transmit the request to perform the management activity that creates or modifies the active directory object to the web services subsystem; and
wherein the web services subsystem that is part of the second domain is configured to
perform the management activity that creates or modifies the active directory object, and
update in real-time an active directory maintained within an active directory database in accordance with the performed management activity such that the updated active directory is accessible to the client device substantially immediately upon completion of the real-time update.

20. The system of claim 19, wherein the active directory object comprises a global group, and wherein the management activity comprises at least one of adding one or more users to the global group and removing one or more users from the global group.

21. The system of claim 19, wherein the active directory object comprises a distribution list, and wherein the management activity comprises at least one of adding one or more users to the distribution list and removing one or more users from the distribution list.

22. The system of claim 19, wherein the management activity comprises assigning administrative authority over the active directory object to one or more users.

23. A system comprising:
a web server that is part of a first domain and configured to provide a web-based interface for display on a client device;
a web services server that is part of a second domain independent of the first domain and selectively and communicatively coupled to the web server;
an object security server selectively and communicatively coupled to the web server and configured to maintain data representative of one or more authorization relationships between one or more users and an active directory object; and
a domain controller selectively and communicatively coupled to the web services server and configured to maintain the active directory object within an active directory;
wherein the web server that is part of the first domain is further configured to
receive a request via the web-based interface from an end-user to perform a management activity that creates or modifies the active directory object located in a particular domain,
acquire authorization from the object security server to ensure that the end-user is authorized to perform the management activity that creates or modifies the active directory object, the authorization based on the data representative of the one or more authorization relationships, and
transmit the request to perform the management activity that creates or modifies the active directory object to the web services server; and
wherein the web services server that is part of the second domain is configured to
perform the management activity that creates or modifies the active directory object, and
update in real-time the active directory maintained by the domain controller such that the updated active directory is accessible to the client device substantially immediately upon completion of the real-time update.

* * * * *